US006194980B1

(12) United States Patent
Thon

(10) Patent No.: US 6,194,980 B1
(45) Date of Patent: Feb. 27, 2001

(54) QUADRATURE HYBRID RF COMBINING SYSTEM

(75) Inventor: Robert J. Thon, Center Point, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 09/314,306

(22) Filed: May 19, 1999

(51) Int. Cl.7 ................................ H01P 5/16; H04B 1/38

(52) U.S. Cl. ............................ 333/109; 370/278; 455/79; 455/103

(58) Field of Search .................................... 333/109, 113, 333/116; 370/201, 278, 282; 455/103, 105, 132, 137, 138, 78–81

(56) References Cited

U.S. PATENT DOCUMENTS 3,619,504 * 11/1971 DeVeer et al. ................... 333/109 X
4,423,392 * 12/1983 Wolfson ............................... 333/116
4,633,202 * 12/1986 Basile et al. ......................... 333/109
5,630,223 5/1997 Bahu et al. .......................... 455/296

* cited by examiner

*Primary Examiner*—Paul Gensler
(74) *Attorney, Agent, or Firm*—Nathan O. Jensen; Kyle Eppele; James P. O'Shaughnessy

(57) ABSTRACT

A radio frequency combining system is disclosed that uses commercially available quadrature hybrid couplers configured in a unique manner to combine any radio frequency sources such as transmitters into a single load such as an antenna. The radio frequency combining system is bidirectional and can be used in the receive mode to combine the output of a receive antenna with outputs from an interference canceller to then supply received signals to a multiple receiver system.

12 Claims, 5 Drawing Sheets

QUADRATURE HYBRID RF COMBINING SYSTEM

BACKGROUND OF THE INVENTION

This invention relates to radio frequency (RF) communications systems and specifically to multiple RF communications systems collocated on airborne, marine, or ground platforms.

Present airborne, marine, or ground platforms with three or more collocated RF communications systems utilize one or more antennas for each system. Multiple antennas require space in short supply on most platforms, increase drag on aircraft, present unwanted unique platform signatures both visibly and on radar, and interact with each other to distort radiation patterns and degrade communications system performance. All platform users desire to reduce the number of antennas on the platform.

Present systems and methods used to reduce the number of antennas have many deficiencies. One type of system, referred to as a multicoupler, employs agile high power filters for the transmitters and preselectors for the receivers. Also used are signal cancellation techniques. These systems are high cost, large in physical size, have high losses of RF energy, offer poor isolation between ports, have interaction between circuit elements causing producibility and maintenance problems.

SUMMARY OF THE INVENTION

A hybrid radio frequency (RF) combining system for combining RF source outputs into a radio frequency combining system output is disclosed. Three or more quadrature hybrid couplers are connected in a series arrangement. Each coupler in the series has an output port, a first input port, a second input port, and an isolation port. The first coupler in the series of quadrature hybrid couplers has the first input port connected to a first RF source, the second input port connected a load, the isolation port connected to a first short, and the output port connected to the input port of the next quadrature hybrid coupler the series. The last coupler in the series of quadrature hybrid couplers has the first input port connected to the output port of a previous coupler in the series, the second input port connected to the last RF source, the isolation port connected to the last short, and the output port forms the radio frequency combing system output. An interim coupler in the series has the first input port connected to the output port of a previous coupler, the second input port connected to an interim RF source, the isolation port connected to an interim short, and the output port connected to the input port of the next quadrature hybrid coupler in the series. The RF combining system combines the outputs of several transmitters into one antenna. The present invention can also be used in a receive mode to combine the output of a receive antenna with outputs from a receiver interference canceller. The output of the combining system is then passed to a multiple receiver system.

It is an object of the present invention to provide an RF combining system that allows for the reduction in the number of antennas on platforms with multiple communications systems and is expandable to add RF sources as needed.

It is another object of the present invention to provide an RF combining system that is small in size, low cost, reduces RF losses, offers good isolation, and is easy to produce and maintain.

It is an advantage of the present invention to use commonly available 90 degree RF hybrid couplers configured in a unique manner.

It is an advantage of the present invention to provide an RF combining system that is a low loss coupler system without complex circuit elements and with excellent isolation between ports.

It is a feature of the present invention to be able to use the RF combining system in both transmit and receive applications.

These and other objects, features, and advantages are disclosed and claimed in the specification, figures, and claims of the present application.

DETAILED DESCRIPTION

The 90-degree hybrid RF combining system of the present invention utilizes low-cost 90-degree RF hybrid or quadrature hybrid couplers commonly available from a number of manufacturers as standard catalog items. The standard quadrature hybrid couplers are configured in a unique manner to combine many RF signals into a single output. The combining system of the present invention can be used for both combining the outputs of many RF sources such as transmitters into one load such as a transmit antenna or to combine the output of a receive antenna with the inputs of a receiver RF cancellation system into one output to a receiver distribution system. The resulting RF combining system has low loss and operates over the full RF spectrum by using frequency bands of standard quadrature hybrid couplers. Frequency bands are required for broadband coverage due to the frequency limitations of the standard quadrature hybrid couplers.

Figure 1:
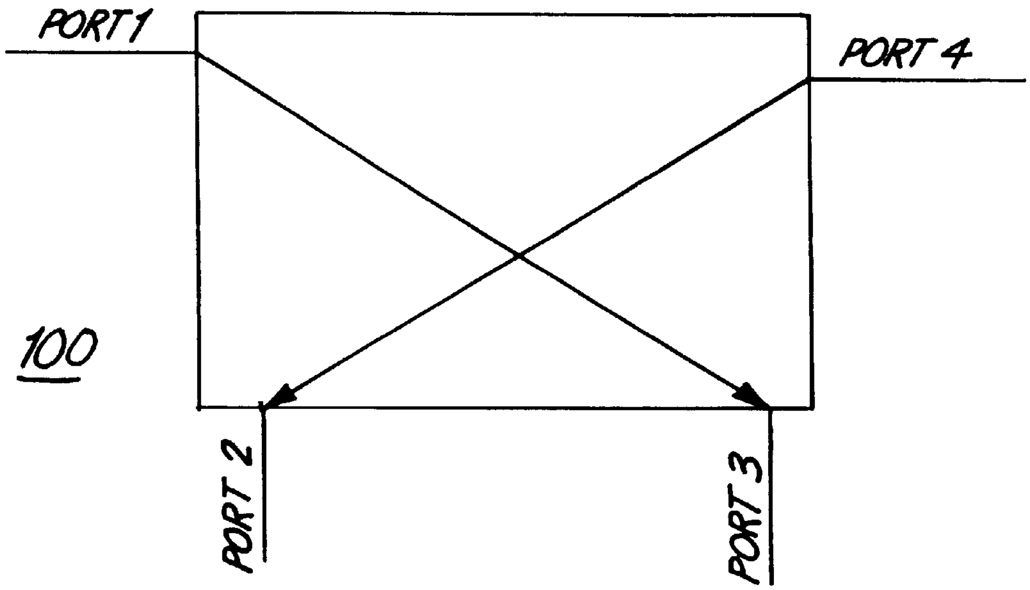
FIG. 1 is a diagram of a typical 90 degree hybrid or quadrature hybrid coupler available commercially.

FIG. 1 is a diagram of a standard quadrature hybrid coupler 100 used in the combining system of the present invention. A quadrature hybrid coupler 100 is a four-port network available from a number of manufacturers in a wide variety of package types, ranging over a frequency spectrum of 10 kHz to 18 GHz. The traditional function of a quadrature hybrid coupler 100 is to split an input signal into two equal amplitude, isolated quadrature outputs or to combine to quadrature phased, equal amplitude signals into a single output.

A quadrature hybrid coupler 100 is a symmetrical network in that signals applied to any port will split equally between the opposite port pairs. In FIG. 1 an input signal applied to port 1 will split equally between ports 2 and 3. The output signal from port 2 will be in-phase with the input signal at port 1. The output signal from port 3 will be shifted by 90 degrees from the input signal at port 1. The input signal is split equally so that the two resulting output signals are each half the power of the input signal or reduced by 3 dB. An important natural characteristic of a quadrature hybrid coupler 100 is its reaction to mismatches. In the case of a common input mismatch, all reflections are directed to the isolated port 4 in FIG. 1, and as a result system match is not affected when port 4 is terminated in it's characteristic impedance. The same condition holds true for output mismatches, reflections are directed to the isolated port 4. The standard quadrature hybrid coupler 100 may also be used to combine two signals at ports 2 and 3 into an output signal at port 1. The quadrature hybrid RF combining system of the present invention uses the mismatch reflection performance and directionality of the standard quadrature hybrid coupler 100.

Figure 2A:
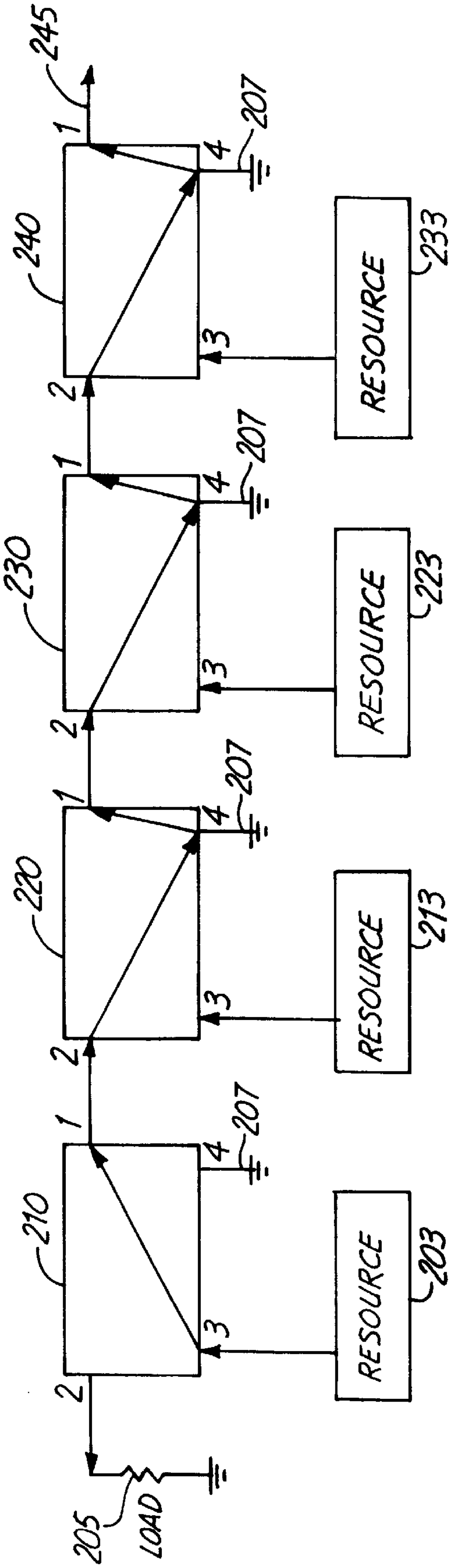
FIG. 2*a* is a diagram of the quadrature hybrid RF combining system of the present invention showing the basic interconnection of the quadrature hybrid couplers of FIG. 1 and the forward power path.
Figure 2B:
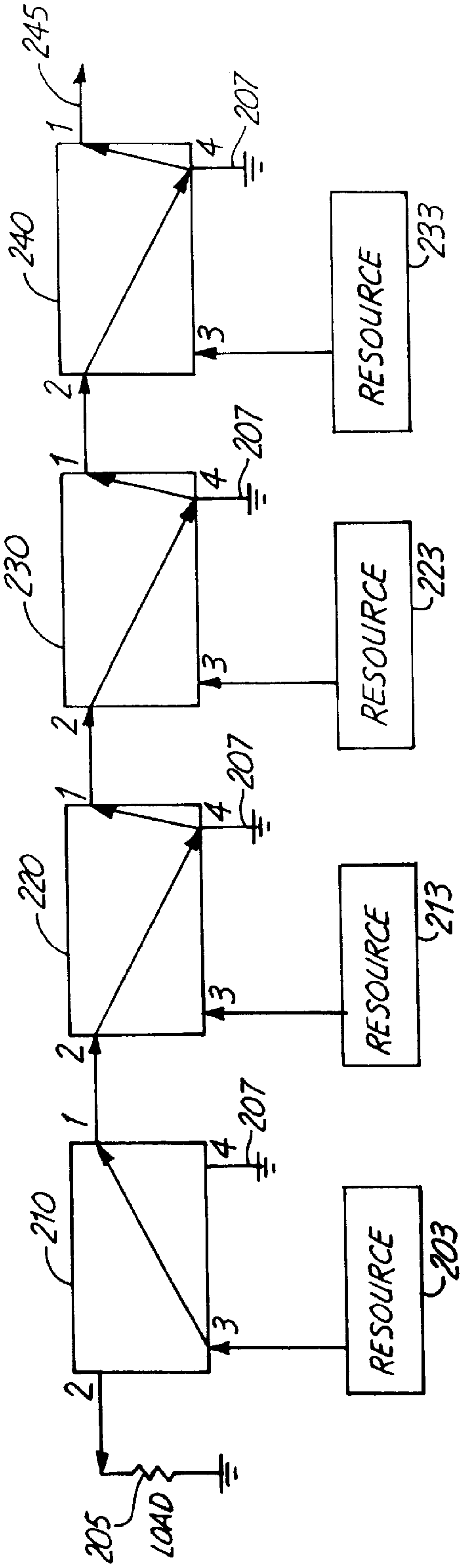
FIG. 2*b* is a diagram showing the reflected power path of the quadrature hybrid RF combining system of FIG. 2*a;*
Figure 2C:
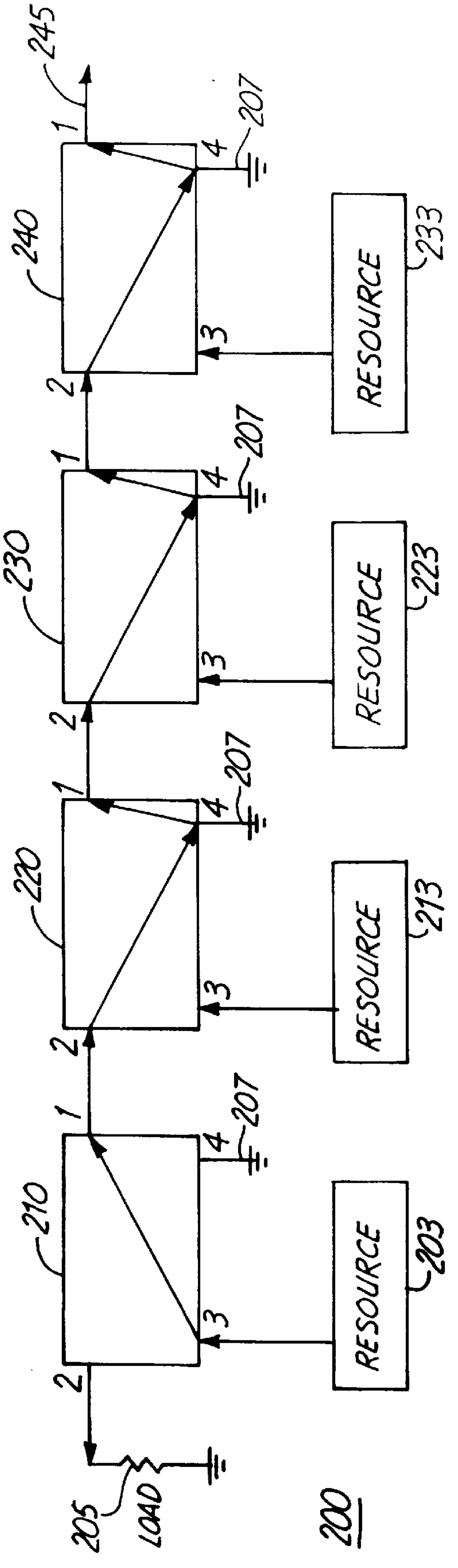
FIG. 2*c* is a diagram showing the combining path of the quadrature hybrid RF combining system of FIG. 2*a*.

A basic quadrature hybrid RF combining system showing the series interconnection of four standard quadrature hybrid couplers is shown in FIGS. 2*a*, 2*b*, and 2*c*. FIG. 2*a* shows the forward power path, FIG. 2*b* shows the reflected power path, and FIG. 2*c* shows the combining path of the quadrature hybrid RF combining system. Four couplers are shown combining four RF sources but three or more couplers can be used to couple three or more RF inputs. In FIGS. 2*a*, 2*b*, and 2*c* ports 2 and 3 of standard quadrature hybrid coupler 100 of FIG. 1 become input ports, port 1 is the output port, and port 4 is the isolation port for each of the couplers 210, 220, 230, and 240 of FIGS. 2*a*, 2*b*, and 2*c*. The first input port 2 of the first coupler 210 is connected to a load 205 that is equal to the characteristic impedance of the quardrature hybrid couplers. The second input port 3 of coupler 210 is connected to first RF source 203. This interconnection of ports 2 and 3 of coupler 210 can be reversed. The output port 1 of coupler 210 is connected to the input port 2 of the next coupler 220. The isolation ports 4 of all couplers in the series interconnection are connected to shorts to ground 207. The second input port of coupler 220 is connected to a second RF source 213. The output port 1 of coupler 220 is connected to the input port 2 of coupler 230. Coupler 230 and all other couplers needed to accommodate the number of RF sources that are to be combined except the last in the system are connected the same as coupler 220. In a system to combine only three RF sources only couplers 210, 220, and 240 would be required. In the system shown in FIGS. 2*a*, 2*b*, and 2*c* four RF sources are to be combined so coupler 230 is needed. If more than four RF sources are to be combined, additional couplers between 230 and 240 would be added. The inputs of the last coupler 240 are interconnected in the same fashion as coupler 220 and any others between 220 and 240. The output of the last coupler 240 is at port 1 and is the combined output 245 of the quadrature hybrid RF combining system. The combined output 245 can be connected to an antenna or any other RF load requiring the combination of any number of input signals.

The forward power path through the quadrature hybrid RF combining system is shown in FIG. 2*a*. RF energy applied to port 3 from RF source 203 is directed to the output port 1 of coupler 210. If RF energy is applied to port 2 of coupler 210, the energy must first be reflected from the short on port 4 of coupler 210 to be combined and passed to the output port 1 of coupler 210. The output energy from output port 1 of coupler 210 is passed to the input port 2 of coupler 220 where it is again reflected from the short on port 4 of coupler 220. The energy is then passed to the output port 1 of 220 and combined with the RF energy from RF source 213 connected to port 3 of coupler 220. This process is repeated for each coupler to the right in the series chain of quadrature hybrid couplers. The combined output 245 for the system is taken from port 1 of the last coupler 240 in the series chain. The combining losses for the quadrature hybrid RF combining system 200 increases from right to left in FIG. 2*a*. In FIG. 2*a*, the loss for RF source 233 into coupler 240 equals one coupler loss, RF source 223 into coupler 230 equals two coupler losses, RF source 213 into coupler 220 equals three coupler losses, and RF source 203 into coupler 210 equals four coupler losses.

FIG. 2*b* is the reflection diagram for the quadrature hybrid combining system 200 showing the reflection path for mismatches on the combined output 245. The reflected signal from the combined output 245 must be reflected off the impedance of the input ports 3 of each of the combining couplers, 210, 220, 230, and 240. If a RF input to port 3 of any of the couplers is not used, it is terminated in a short or open. The reflections from the combined output 245 passing through the combining system 200 are directed to the first coupler 210 in the chain. The reflected power is dumped into the load 205 connected to the input port 2 of coupler 210.

FIG. 2*c* shows how the RF energy is combined through the quadrature hybrid RF combining system 200. The process simply combines all RF energy as it passes through the directional characteristic of the quadrature hybrid couplers with the resulting RF signal at the combined output 245 at port 1 of coupler 240. The RF source 203 at input port 3 of coupler 210 is passed to the output port 1 of 210 and then to the input port 2 of coupler 220 where it is reflected form the short 207 on isolation port 4 of coupler 220 and then passed to output port 1 of coupler 220 to be combined with the RF source 213 from coupler 220 input port 3. The combined output from output port 1 of coupler 220 is passed to the input port 2 of coupler 230 to be combined in a similar fashion with the input from RF source 223. The combined output from sources 203, 213, and 223 are combined in a similar fashion with RF source 233 in coupler 240 to form the combined output 245 at output port 1 of coupler 240.

Figure 3:
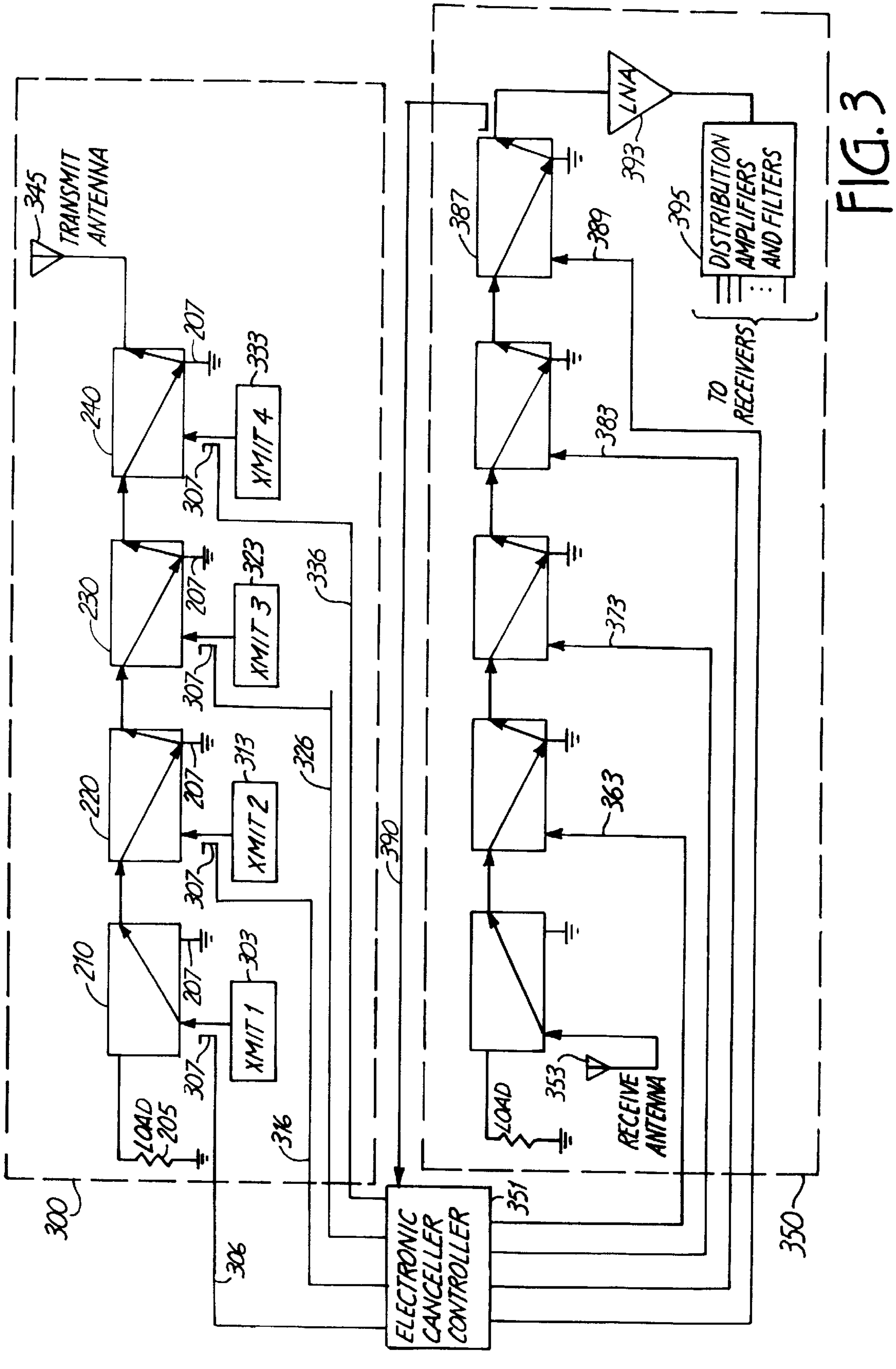
FIG. 3 is a diagram of the present invention using quadrature hybrid couplers to combine the outputs of several transmitters into a single antenna in the system transmit mode of an electronic cancellation system and to combine the output of a receive antenna with the outputs of an electronic canceller in the system receive mode of the electronic cancellation system.

The quadrature hybrid RF combining system of the present invention can be used to combine the outputs of many RF sources such as transmitters collocated on a platform into one antenna. The quadrature hybrid RF combining system can also be used with the receivers collocated in the platform. One of the techniques known in the art used to reduce interference to receivers on the same platform with many transmitters transmitting while the receivers are receiving is electronic cancellation. FIG. 3 shows the quadrature hybrid RF combining system in an electronic cancellation system in the system transmit mode and the system receive modes. In FIG. 3 two quadrature hybrid RF combining systems are shown, one for RF power combining and the other to combine the electronic cancellation signals with the incoming receive RF signals.

In the RF power combining system 300 in FIG. 3, a tap from each transmitter RF output (303, 313, 323, and 333) is obtained from a device such as a 6-dB coupler 307 to be used as a reference signal (306, 316, 326, and 336) to the electronic canceller controller 351.

The electronic canceller controller inverts (180-degree phase shift) each of the reference signals (306, 316, 326, and 336) from each of the transmitters, adjusts the amplitude, and routes it to the receiver quadrature hybrid RF combining system 350 in FIG. 3. The canceller controller is a closed loop adaptive system using the error signal 390, shown in FIG. 3, from the receive quadrature hybrid RF combining system 350 to adjust the phase and amplitude of the interfering signals to accomplish the cancellation process. The error signal 390 is a composite of all channels, thus each channel canceller controller 351 requires frequency information by which to select the proper information from the error signal.

The receive quadrature hybrid RF combining system 350 in FIG. 3 combines the RF energy that couples between the receive antenna 353 and transmit antenna 345 with the inverse canceller signals 363, 373, 383 and 389 resulting in electronic cancellation of typically about 60 dB. After the unwanted collocated transmitter signals are cancelled, the remaining received RF signals are amplified 393 and distributed to all receiver channels in the system by distribution amplifier and filter network 395. The electronic cancellation system can operate full and half duplex. The receive quadrature hybrid combining system 350 requires one additional hybrid coupler 387 in the system because the receive antenna 353 RF signal must be combined with the output of four cancellers 363, 373, 383, and 389.

It is believed that the quadrature hybrid RF combining system and method of the present invention and many of its attendant advantages will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A radio frequency combining system for combining radio frequency signals into a radio frequency combining system output comprising:

a plurality of n series-connected quadrature hybrid couplers each having an output port, a first input port, a second input port, and an isolation port;

a first coupler of said plurality of n series-connected quadrature hybrid couplers having the first input port connected to a first radio frequency source, the second input port connected to a load, the isolation port connected to a first short, and the output port connected to the input port of a second quadrature hybrid coupler in the series;

a second coupler of said plurality of n series-connected couplers having the first input port connected to the output port of the first coupler, the second input port connected to a second radio frequency source, the isolation port connected to a second short, and the output port connected to the input port of a next quadrature hybrid coupler in the series; and an nth coupler of said plurality of n series-connected quadrature hybrid couplers having the first input port connected to the output port of a n-1 coupler in the series, the second input port connected to an nth radio frequency source, the isolation port connected to an nth short, and the output port forming the radio frequency combining system output.

2. The radio frequency combining system of claim 1 wherein n is three or more.

3. The radio frequency combining system of claim 1 wherein the radio frequency combining system output is connected to a transmit antenna.

4. The radio frequency combining system of claim 3 wherein the first radio frequency source, the second radio frequency source and the nth radio frequency source are radio frequency transmitters.

5. The radio frequency combining system of claim 1 wherein the first radio frequency source is a receiving antenna.

6. The radio frequency combining system of claim 5 wherein in the number of quadrature hybrid couplers is n+1.

7. The radio frequency combining system of claim 6 wherein n is three or more.

8. The radio frequency combining system of claim 7 wherein the second and n+1 radio frequency sources are first and n canceller output signals respectively.

9. A radio frequency combining system for combining radio frequency sources comprising n quadrature hybrid couplers connected in series each having a first input port connected to a radio frequency source and an isolation port connected to a short, a second input port on a first coupler connected to a first load, the second input port on all other couplers connected to an output port of a previous coupler, and the output port of a last coupler connected to a second load.

10. The radio frequency combining system of claim 9 wherein n is three or more.

11. The radio frequency combining system of claim 9 wherein the radio frequency sources are radio frequency transmitters.

12. The radio frequency combining system of claim 11 wherein the second load is an antenna.

* * * * *